3,326,893
METHOD FOR MAKING AMYLOSE DERIVATIVES

Raymond J. Moshy, Westport, Conn., Felix J. Germino, Peekskill, N.Y., and Hans W. P. Panzer, Stamford, Conn., assignors to American Machine and Foundry Company, a corporation of New Jersey No Drawing. Original application Dec. 29, 1960, Ser. No. 79,175, now Patent No. 3,188,237, dated June 8, 1965. Divided and this application July 13, 1964, Ser. No. 449,665

6 Claims. (Cl. 260—233.3)

This application is a division of application Ser. No. 79,175 filed on Dec. 29, 1960, now U.S. Patent No. 3,188,237.

This invention relates to the activation of amylose and to the derivatives obtained by the subsequent treatment of activated amylose.

With a few significant exceptions, amylose, the linear fraction of starch has chemical and physical similarity to cellulose. Amylose is a polyglucose linked by α-1,4 bonds. Cellulose is a polyglucose linked by β-1,4 bonds. This difference in chemical linkage is the one notable chemical distinction between the two polymers. The α linkage, however, makes amylose digestible and therefore suitable as a food material while the β linkage makes cellulose indigestible. The alpha configuration makes the glucose monomers of amylose spiral so that the whole amylose polymer has a helical configuration. The cellulose polymer, on the other hand, is a linear rigid structure which is extensively hydrogen-bonded and as a consequence is relatively much more insoluble than the amylose polymer. Additionally, cellulose is of substantially higher molecular weight than amylose. Commercial amylose is substantially insoluble in water. This is due to retrogradation of amylose, a condition in which amylose is in a dense highly orientated or crystalline form. Retrograded amylose, from a practical standpoint, is chemically unreactive, requiring extreme conditions which cause molecular degradation in order to effect chemical reaction unless the amylose has been subjected to prior activation. Activated amylose, on the other hand, is capable of being derivatized under mild conditions with minimum degradation. Retrograded amylose is substantially insensitive to amylolysis and is water insoluble. Thus in this inactive or retrograded form, amylose has very little utility.

Although solubilization of retrograded amylose has been attempted in the past, for example by autoclaving or use of sodium hydroxide to form amylose solution, these means have not been practically successful in producing activated amylose as a product. Other reactive solvent systems attempted are use of liquid ammonium or potassium hydroxide. Such systems have likewise been impractical. Each of the known prior techniques has suffered from certain disadvantages which has precluded the activation of amylose on a significant basis to make it attractive commercially. For example, the water-solubilized amylose solutions, as such are unstable and as a consequence, the amylose retrogrades readily. Additionally, the number of reactions of amylose which can be run in aqueous medium are relatively limited. The activation of amylose by the alkaline solution route produces a product which is undesirable in various respects. For example, it suffers from excessive degradation. Furthermore, the reactive nature of this solvent in many cases, such as in ester formation, complicates the further derivatization of the amylose.

It is accordingly an object of the present invention to provide an improved and practical method for the activation of amylose.

It is a further object to provide an activated amylose product economically in relatively high yields.

It is another object of the present invention to provide an improved method for obtaining derivatives of amylose.

It is still a further object of the invention to provide novel derivatives of amylose.

Still a further object of the invention is to provide new methods for solubilization of amylose.

Additional objects and advantages of the invention will become apparent from the description of the invention hereinbelow.

In general the invention concerns the pretreatment of amylose for the purpose of activating this material; a treatment which is necessary from a practical standpoint to condition amylose for chemical derivatization. The extreme resistance of amylose is such that when chemical reaction of this material is forced, a serious degree of breakdown in the chemical links of the amylose polymer occurs with little derivatization. As a consequence, amylose so degraded substantially loses its attractive properties, e.g., films prepared therefrom have a significantly decreased strength and homogeneity. Also, there is a direct relationship between obtaining a high degree of substitution and the degree of degradation of "unactivated" amylose. Substantially degraded amylose results in a product having a relatively low viscosity. Preferably the treatment of the amylose should be relatively mild in order that the molecular weight reduction is minimal.

Although various techniques for producing activated amylose are known, some of which have been noted hereinabove, the essence of the present invention concerns improved means to obtain activated amylose in relatively high yields, i.e., in the order of about 90% and greater by using practically effective and efficient techniques to produce an activated material with minimum breakdown of the chemical bonds and minimum lowering of molecular weight of the amylose structure.

By the process of the invention amylose derivatives having a relatively high degree of substitution (DS) of about the maximum of 3 are obtained. By "degree of substitution" is meant the conversion of activated amylose such that the hydroxyl groups of such unit of the amylose molecule are substituted in the formation of the derivatives. Of the 3 available hydroxyl groups per anhydro-glucose unit, i.e. a degree of substitution of 3, it is desirable that degree of substitution of about 2.0 and preferably a degree of substitution close to 3 be obtained in the course of amylose derivatization. With derivatives having long chain length, i.e., above about 4 carbon atom chain, a somewhat lower D.S. may be appropriate. For the purpose of defining activation in this disclosure, a degree of substitution of below about 1.5 in the formation of acetate derivatives is generally indicative of incompletely activated amylose. Retrograded amylose may be characterized as amylose in a state which is not substantially attached either by α- or β-amylase enzymes.

The present invention provides a process whereby a reactive form of amylose is produced by dissolving amylose, which is substantially retrograded and inert to derivative forming reactions, in certain specific solvent liquids and then precipitating the dissolved amylose by the addition of a liquid precipitant which is miscible with the solvent liquid (said precipitant being a non-solvent for amylose) and subsequently separating the activated amylose precipitate. Alternately, the dissolved amylose may be reacted in solution in certain of the specified solvents in preparing some derivatives.

The relatively rapid and efficient means for dissolving and the precipitating the solubilized amylose according to the invention provides a product which is stable, relatively active material and capable of forming a product having a high degree of substitution.

In solubilizing the amylose for purpose of activation, the intermolecular forces binding the polymer molecule together are sufficiently disrupted to affect solution of the polymer. This is distinguished from the system in which the intermolecular forces are only partially disrupted and the amylose polymer is swelled by the solvent. The latter concept in which amylose is not dissolved forms the basis of another patent application in the names of two of the co-inventors of the present application, Felix J. Germino and Raymond J. Moshy, Ser. No. 79,427 filed on even date herewith now U.S. Pat. 3, 184,335.

The solubilizing of amylose, as used herein, contemplates the mixing of amylose with a solvent liquid thereby forming a homogeneous dispersion from which the solid substance is then recovered by crystallization, percipitation or other physical process. Although generally, solubility is merely a physical phenomenon, in the present invention upon repreciptation of the amylose (with a liquid miscible with the solvent), the amylose precipitate is formed randomly and the hydrogen bonding of the molecule is such that the typical insoluble retrograded form is absent. This provides the basis for the chemical change, i.e., formation of derivatives. It is this change in the amylose which accounts for its relative activity.

As suitable solvents for dissolving the retrograded amylose, we have discovered that certain compounds may effectively be employed for this purpose. As appropriate compounds we have discovered that those selected from the group consisting of 2-aminoethanol, pyrrolidones of the formula

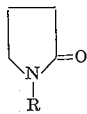

wherein R is a substituent selected from the group consisting of hydrogen and alkyl radicals of 1–3 carbon atoms, water at a temperature in excess of 130° C. and sulfoxide compounds of the formula

wherein $R^1$ and $R^2$ are substituents from the groups consisting of alkyl radicals of 1–6 carbon atoms may suitably be employed. After the amylose is dissolved it is then precipitated from the solution in a chemically reactive, substantially non-degraded form by the addition of an organic liquid compound. Useful compounds to precipitate amylose from solution are those which are miscible with the amylose solvent. Amylose activated in this manner may then be suitably reacted to form various derivatives compounds, e.g., the esters such as amylose acetate, amylose propionate, amylose butyrate and other amylose organic and inorganic acid esters, such as succinates, phosphates, sulfates, mixed esters such as acetatebutyrate; acetals, formals, and ketals such as dimethyl ketal; isocyanate derivatives such as urethanes from toluene diisocyanates; and the analogous thiocyanate derivatives.

Suitable pyrrolidones within the above formula include 2-pyrrolidone, N-methyl-2-pyrrolidone, N-ethyl-2-pyrrolidone, and N-propyl-2-pyrrolidone.

Suitable sulfoxide compounds contemplated as within the formula

are the compounds of this generic group which are liquid under normal pressures and temperatures. Examples of suitable compounds are such as dimethyl sulfoxide, diethyl sulfoxide, methyl ethyl sulfoxide, methyl propyl sulfoxide, ethylbutyl sulfoxide and the like.

Solubilization rates vary with temperatures. In the case of pyrrolidones advantageous results are obtained, for example, by dissolution of the amylose at 100° C. in about 3 minutes. At lower temperatures longer times are needed. As a further example, solubilization of amylose in dimethyl sulfoxide is effected in about 30 minutes at room tempearture. At higher temperatures, solubilization is even more rapid.

In preparing the activating solutions, concentrations of amylose as low as 0.5% in the solvent may be used. Preferably concentrations between about 1 and 20% are used, but good results may be obtained with concentrations as high as about 25% at atmospheric pressure. Most desirably concentrations of amylose between about 3 and 13% are employed.

Various precipitating liquids readily ascertainable by those skilled in the art may be employed in separating the amylose from solution. Suitable precipitants which may be usefully employed, which are miscible with the liquid solvent but which do not dissolve the amylose are such, for example, as the ketones, e.g. acetone, methyl ethyl ketone etc.; alcohols, such as methanol, ethanol, iso and n-propanol, tertiary butyl alcohol etc.; aromatics, such as benzene, toluene, xylene; or acids such as acetic, propionic or butyric acids and the like alone or in admixture with each other. Use of non-reactive compounds for final wash after precipitation is highly advantageous. Preferably the final wash employs a compound compatible with or similar to that comprising the derivative to be formed. For example, in the formation of amylose acetate, at least the final wash for the amylose precipitated from the activating solution preferably comprises glacial acetic acid.

The following examples relating to the activation of amylose in solution illustrate the invention and its advantages.

EXAMPLE 1

Four hundred parts of amylose was blended into 5 liters of hot water and dissolved under pressure by passing through a Votator, heat exchanger pressure reaction vessel, under 80 p.s.i.g. steam for a period of 3 minutes. The temperature of the effluent solubilized amylose solution was 100° C. The amylose solution was precipitated by introducing it directly into ethyl alcohol. The precipitated amylose solution was filtered and washed twice with glacial acetic acid. The amylose product has excellent reactivity in the formation of derivatives. This example was duplicated with glacial acetic acid as the sole precipitating solvent with good results.

One part of the amylose so activated from each run is reacted with a solution containing 8 parts of acetic anhydride containing catalytic amounts of sulfuric acid. A smooth acetylation occurred in each case yielding amylose acetate with a DS of 3.0 and 2.8 and yields of 95% and 92% respectively.

EXAMPLE 2

Ten parts of amylose was dissolved by stirring in 100 parts of dimethylsulfoxide at room temperature within a period of 15 minutes. Activated amylose is precipitated from solution with glacial acetic acid and washed twice with glacial acetic acid. The precipitate was easily derivatized. Amylose acetate with a degree of substitution of 2.9 was prepared from this activated amylose with acetic anhydride in the manner described under Example 1.

As an alternate procedure in derivatizing the dimethylsulfoxide activated amylose, the amylose was reacted in the dimethylsulfoxide solution directly as described in the following procedure.

EXAMPLE 3

Ten parts of amylose was dispersed into 90 parts of dimethylsulfoxide to form a 10% solution. Ninety parts of acetic anhydride containing catalytic amounts of sulfuric acid about 0.05% by weight was then added dropwise to the solution. After approximately 50% of the sulfuric acid-catalyzed acetic anhydride mixture was added, the amylose precipitated out of solution. The temperature climbed to 40° C. The reaction was continued for 3 hours and then the precipitate was separated by filtration. Amylose acetate having a degree of substitution of 2.4 in quantitative yield of 90.7% was obtained.

EXAMPLE 4

Fifteen parts of amylose was placed into 100 parts of hot N-methyl-2-pyrrolidone (100° C.) and blended for 3 minutes at this temperature. The resultant solution is cooled to room temperature whereby a gel is formed. This gel is then blended at room temperature for 1 minute with additional 100 parts of cold N-methyl-2-pyrrolidone. The amylose is solubilized and is then precipitated from solution with acetone. The precipitate washed once with propionic acid and derivatized to form amylose propionate having a degree of substitution of 3. In forming the amylose derivative one part of activated amylose to 8 parts of propionic anhydride is reacted in the presence of sulfuric acid as described in the derivatization procedure of Example 1. Amylose propionate having a DS of 2.95 and a yield of 96% is produced.

EXAMPLE 5

Forty parts of commercial amylose were dissolved within 30 minutes in 300 parts of 2-aminoethanol at room temperature in a Waring Blendor. The solution was poured into 3000 parts of methanol with continuous stirring and a white fluffy precipitate was collected and washed twice with fresh portions of methanol and with a final wash of glacial acetic acid. The material thus obtained is ready for reaction. Amylose acetate derived therefrom by reaction with acetic anhydride in the presence of catalytic amounts of sulfuric acid (0.1% by weight) has a degree of substitution above 2.8.

EXAMPLE 6

(A) Twenty parts of amylose were blended into 150 parts of hot 2-pyrrolidone (90° C.) for 4 minutes. The solubilized amylose was precipitated from the 2-pyrrolidone solution with glacial acetic acid, washed twice with glacial acetic acid and acetylated. Amylose acetate prepared from the activated product of this example has a degree of substitution greater than 2.7.

(B) Example 6A was substantially repeated with the exception that an equal amount of N-vinyl-2-pyrrolidone was substituted for the 2-pyrrolidone. N-vinyl-2-pyrrolidone did not dissolve the amylose. Even after blending the amylose at 90° C. for 30 minutes the amylose was substantially undissolved with N-vinyl-2-pyrrolidone.

Derivatization with acetic anhydride gave a product with a DS below 0.5. The results with N-vinyl-pyrrolidone are indicative of the selectivity of activating solvents for amylose.

(C) Thirteen parts of amylose was mixed for 15 minutes in N-methyl-2-pyrrolidone. The sample was cooled to room temperature at this point a two phase system was present. The mixture was blended for 1 minute with an additional 100 parts of N-methyl-2-pyrrolidone. The amylose was then solubilized. Upon precipitation and derivatization as in 6A amylose acetate having a degree of substitution of 2.8 and a yield of 91% is obtained.

Comparative Example A

Forty parts of amylose not subjected to prior activation was reacted with one part of sulfuric acid and 218 parts of acetic anhydride at 60° C. for three hours. The reaction mixture was a two phase system having a solid and liquid phase. Analysis of both phases for acetyl value were made.

The results are as follows:

|  | Yield | DS |
|---|---|---|
| Liquid Phase, g | 7.5 | 3.0 |
| Solid Phase, g | 38.5 | 0.36 |

It is seen from the results that more than 70% of the amylose comprising the solid phase is not activated.

Comparative Example B

Forty grams of amylose without prior activation is reacted for 3 hours at 100° C. with 336 grams of pyridine and 158 grams of acetic anhydride. This activation attempt was also quite unsuccessful. This reaction mixture was a two phase system. Analysis of both phases were made. The results show that more than 70% of the amylose is unactivated.

The results are as follows:

|  | Yield | DS |
|---|---|---|
| Liquid Phase, g | 9 | 2.4 |
| Solid Phase, g | 34 | 0 |

Amylose derivatives prepared from the activated amylose according to the invention may usefully be employed as film-forming compositions.

In the use of amylose derivatives various additives may by introduced into compositions thereof, as is known in the art. For example, suitable quantities of plasticizer, e.g., dibutyl phthalate, may be incorporated in the formation of films.

In the practice of the invention it is possible to replace up to about 25 or 30% or more of the amylose with amylopectin without substantially impairing the character of the derivative obtained.

In addition to the amylose activating advantages of the dialkyl sulfoxides and 2-aminoethanol of the invention, these compounds have been found to be excellent solvents for use in preparing fibers and films of amylose from solutions thereof by extrusion into coagulating baths. Coagulating baths which are suitable for treating dope solutions are known in the art and include various aqueous medium containing for example salts such as the sulfates, e.g., potassium, magnesium, sodium sulfates and the like; chlorides such as sodium, potassium and calcium; organic compounds such as methyl, ethyl, propyl, alcohols, acetone or other ketones and the like or combinations thereof. The coagulum is then passed through a washing bath containing water and small amounts of magnesium sulfate. It is dried, or cross linked and then dried.

The following examples illustrate suitable coagulating procedures which may be employed. It is understood that various alternate coagulating bath composition known in the art may be employed.

EXAMPLE 7

A fifteen percent by weight amylose dope solution is prepared as follows. Fifteen parts of amylose are introduced slowly by stirring into dimethylsulfoxide over a period of 30 minutes at 28° C. The blended amylose is extruded through spinerette into a saturated solution of ammonium sulfate. The ammonium sulfate concentration and the coagulating solution is between 40 and 50% by weight. The spinneret holes are 0.1 mm. (0.004 inch). The coagulating bath is maintained at a temperature of about 30–65°. The spun filament velocity is approximately 45 meters per minute as determined by the linear speed of the winding reels. The spun fibers are washed until salt free with tap water and then preferably washed with an alcohol such as ethyl or methyl to prevent sticking together before drying at suitable temperatures. When washed in alcohol the temperature in excess of 100° C. may be employed for drying without the filaments sticking.

EXAMPLE 8

The procedure of Example 6 is substantially repeated with the exception that a 12% amylose dope solution in 2-aminoethanol is prepared in a like manner. The dope solution is prepared by dissolving 12 parts of commercial amylose in 88 parts of 2-aminoethanol. The fibers are extruded, washed and dried as described in Example 6.

Fibers so prepared find utility in a variety of applications, for example, as an edible film combined with protein fibers useful for synthetic food items or in the formation of a filter unit in tobacco smoking articles.

We claim:

1. The method for making amylose derivatives comprising activating substantially retrograded amylose by dissolving the amylose in a liquid solvent of the formula

wherein, $R^1$ and $R^2$ are substituents selected from the group consisting of alkyl radicals of 1–6 carbon atoms, introducing into said solution an agent selected from the group consisting of acetic, propionic and butyric anhydrides and recovering the amylose derivative.

2. The method for making amylose derivatives comprising activating substantially retrograded amylose by dissolving the amylose in dimethylsulfoxide, introducing into the solution an agent selected from the group consisting of acetic, propionic and butyric anhydrides and recovering the amylose derivative.

3. The method of claim 1 in which the solubilized amylose in solution is precipitated with glacial acetic acid prior to introduction of said agent and the resultant precipitate is thereafter reacted with said agent.

4. The method for making amylose derivatives comprising activating substantially retrograded amylose by dissolving the amylose in N-methyl-2-pyrrolidone, introducing into the solution an agent selected from the group consisting of acetic, propionic and butyric anhydrides and recovering the amylose derivative.

5. The method for making derivatives of amylose comprising activating substantially retrograded amylose by dissolving the amylose in a solvent liquid selected from the group consisting of 2-aminoethanol, a pyrrolidone of the formula

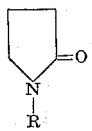

wherein R is selected from the group consisting of hydrogen and alkyl radicals of 1–3 carbon atoms, water in excess of its atmospheric boiling point, and sulfoxide compounds of the formula

wherein $R^1$ and $R^2$ are substituents selected from the group consisting of alkyl radicals of 1–6 carbon atoms, precipitating the solubilized amylose from said solvent liquid with glacial acetic acid, separating the amylose precipitate and reacting the precipitate with an agent selected from the group consisting of acetic, propionic and butyric anhydrides.

6. The method for making derivatives of amylose comprising activating substantially retrograded amylose by dissolving the amylose in a solvent liquid selected from the group consisting of 2-aminoethanol, a pyrrolidone of the formula

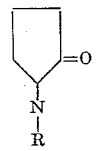

wherein R is selected from the group consisting of hydrogen and alkyl radicals of 1–3 carbon atoms, water in excess of its atmospheric boiling point, and sulfoxide compounds of the formula

wherein $R^1$ and $R^2$ are substituents selected from the group consisting of alkyl radicals of 1–6 carbon atoms, precipitating the solubilized amylose from said solvent iquid with propionic acid, separating the amylose preciiptate and reacting the precipitate with an agent selected from the group consisting of acetic, propionic and butyric anhydrides.

References Cited

UNITED STATES PATENTS 3,030,667  4/1962  Kunz _____ 264—218
3,188,237  6/1965  Mosby et al. _____ 127—32

ALEXANDER H. BRODMERKEL, *Primary Examiner.*

MORRIS LIEBMAN, *Examiner.*

D. J. ARNOLD, *Assistant Examiner.*